United States Patent [19]
Chalk

[11] Patent Number: 5,410,818
[45] Date of Patent: May 2, 1995

[54] SCROLL CHAMFER GAUGE
[75] Inventor: Daniel C. Chalk, Springboro, Ohio
[73] Assignee: Copeland Corporation, Sidney, Ohio
[21] Appl. No.: 83,104
[22] Filed: Jun. 25, 1993
[51] Int. Cl.[6] .................................................. G01B 5/24
[52] U.S. Cl. .......................................... 33/833; 33/836; 33/531; 33/544.4; 33/534
[58] Field of Search ................ 33/531, 532, 534, 535, 33/542, 544.4, 792, 794, 797, 807, 836, 833, 832

[56] References Cited

U.S. PATENT DOCUMENTS

| | | |
|---|---|---|
| 2,758,382 | 8/1956 | Hurd ............................. 33/836 |
| 2,959,864 | 11/1960 | Webb et al. ..................... 33/833 |
| 5,102,316 | 4/1992 | Caillat et al. . |
| 5,103,558 | 4/1992 | Herrick et al. . |
| 5,105,634 | 4/1992 | Utter . |
| 5,122,040 | 6/1992 | Fields . |

FOREIGN PATENT DOCUMENTS

| | | | |
|---|---|---|---|
| 1489817 | 7/1967 | France ......................... 33/531 |
| 0626528 | 2/1936 | Germany ....................... 33/833 |
| 1223023 | 4/1986 | U.S.S.R. ....................... 33/534 |

Primary Examiner—Alvin Wirthlin
Attorney, Agent, or Firm—Harness, Dickey & Pierce

[57] ABSTRACT

A scroll chamfer gauge measures the chamfer between the flank surface of the scroll and the tip of the scroll. The gauge is positioned on the tip of the scroll and has a locator which positions the gauge with respect to the flank surface. A probe extends from the gauge and locates the intersection of the chamfer and the flank surface. An indicator provides a direct reading of the height of the chamfer parallel to the flank surface.

19 Claims, 2 Drawing Sheets

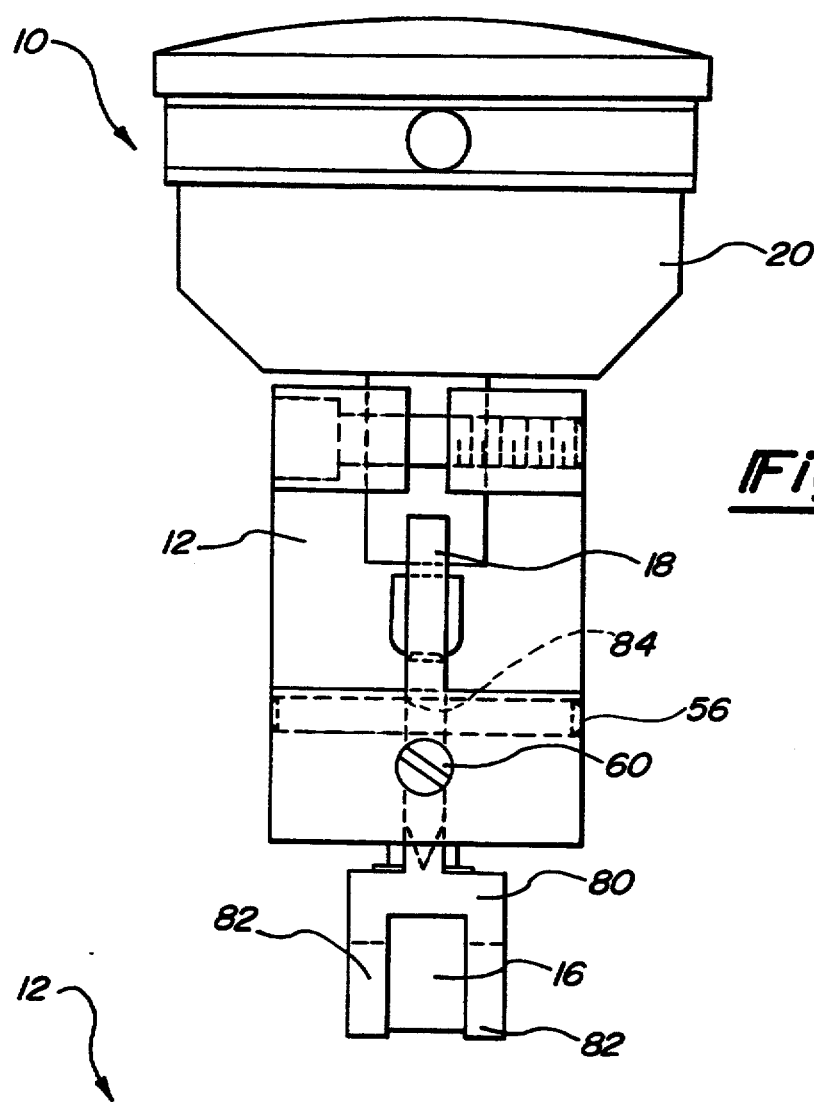
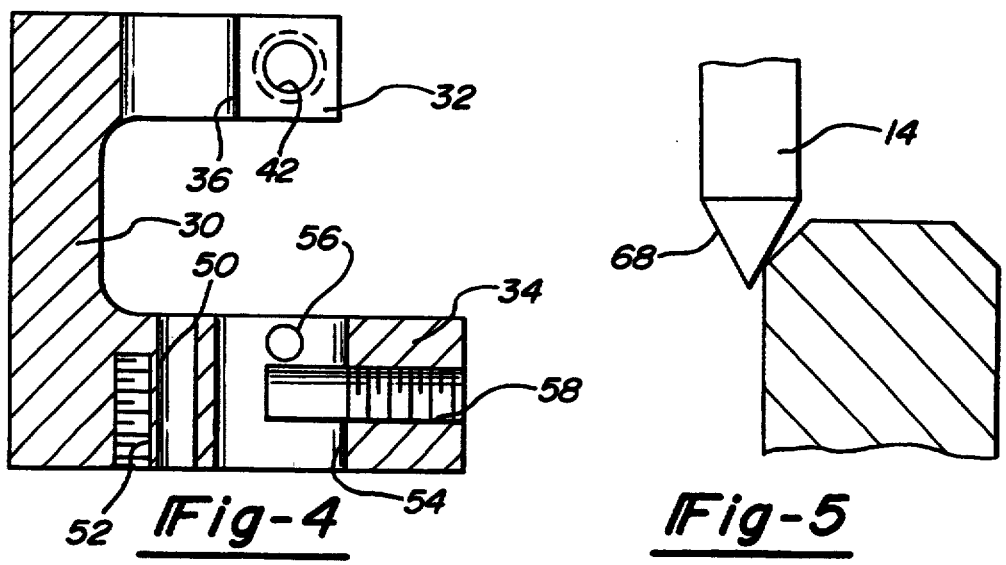

SCROLL CHAMFER GAUGE

FIELD OF THE INVENTION

The present invention relates to a gauge for measuring the vanes of a scroll compressor. More particularly, the present invention relates to a gauge for measuring the chamfer on the edges of the scroll vanes of a scroll compressor.

BACKGROUND AND SUMMARY OF THE INVENTION

Although the present invention is believed to be applicable to different types of scroll machines, it is disclosed herein as a gauge for measuring the scroll vane chamfer on a scroll vane embodied in a refrigerant compressor for use in air conditioning, heat pump and refrigerating systems, such as those disclosed in Applicant's Assignee's U.S. Pat. No. 5,102,316, the disclosure of which is hereby incorporated herein by reference.

Scroll apparatus for fluid compression are typically comprised of two upstanding interfitting involute spirodal wraps which are generated about respective axes. Each respective involute wrap is mounted upon an end plate and has a tip disposed in contact or near contact with the end plate of the other respective scroll wrap. Each scroll wrap further has flank surfaces which adjoin in moving line contact, or near contact, the flank surfaces of the other respective scroll wrap to form a plurality of moving chambers. The chambers move from the radial exterior end of the scroll wraps to the radially interior ends of the scroll wraps for fluid compression. The scroll wraps, to accomplish the formation of chambers, are put in relative orbital motion by a drive mechanism which constrains the scroll to relative non-rotational motion.

The scroll wraps themselves may be manufactured either separately from or integrally with the end plate upon which they are disposed. In the first case, the scroll wrap is typically formed into the desired scroll involute shape and inserted into a corresponding slot formed in the scroll end plate. The scroll wrap may be retained in the slot by epoxy, a separate key producing a friction fit of the wrap within the slot, deformation of the portion of the scroll within the slot, or similar means known in the art.

In the second case, the scroll wrap is machined to final form from a forging or casting which has the general shape of the scroll wrap and end plate, or the scroll wrap is machined from a solid plate. Typically, at least one rough cut will be made to define the general shape of the scroll wrap. At least one finishing cut is made to finish each scroll wrap flank and the floor of the scroll wrap. Another finishing cut can be required to machine the scroll wrap tips or the tips can be machined at the same time as the flanks and/or the floor. The scroll tips can be machined with a radius, a chamfer, or other blending features present at the point where the flank of the scroll meets the tip of the scroll. Scroll wraps manufactured integral with the base typically offer greater strength, increased operating life and improved reliability.

One problem which arises from the manufacturing of the scroll wrap is the gauging of the scroll wrap to insure the manufactured product is to blueprint specifications. One area of particular difficulty is the measurement of the chamfer between the scroll wrap flank and its tip. The chamfer at the tip of the scroll wrap insures that there will be no interference with the blending feature at the base of the opposing scroll wrap. In addition the chamfer acts as a lead-in for the lubricant between the tip of the scroll and its opposing base. If the chamfer is too small, the tip of the vane will interfere with the blending feature at the base of the opposing scroll as well as having a tendency to wipe the oil from the opposing base rather than guiding it between the two members for lubrication. The interference with the base of the opposing scroll can cause excessive loading on the vanes in a compressor not having radial compliance. If the compressor incorporates radial compliance, the interference with the base can cause a severe reduction in the capacity and efficiency of the compressor. If the chamfer is too large, the flank sealing of the opposing scroll wraps is affected thus lowering the efficiency of the scroll apparatus.

The present invention discloses a gauge which can be placed at various positions along the tip of the scroll wrap to provide an accurate reading of the size of the chamfer. The design of the probe tip is such that the probe position measures the side dimension of the chamfer along the wrap height direction.

Other advantages and objects of the present invention will become apparent to those skilled in the art from the subsequent detailed description, appended claims and drawings.

DESCRIPTION OF THE DRAWINGS

In the drawings which illustrate the best mode presently contemplated for carrying out the present invention:

FIG. 3 is an end view of the scroll chamfer gauge of FIG. 1;

FIG. 4 is a longitudinal side view in cross section of the scroll chamfer gauge housing of FIG. 1; and FIG. 5 is an enlarged view of the gauge tip meeting the chamfered scroll tip shown in FIG. 1.

DESCRIPTION OF THE PREFERRED EMBODIMENT

Figure 1:
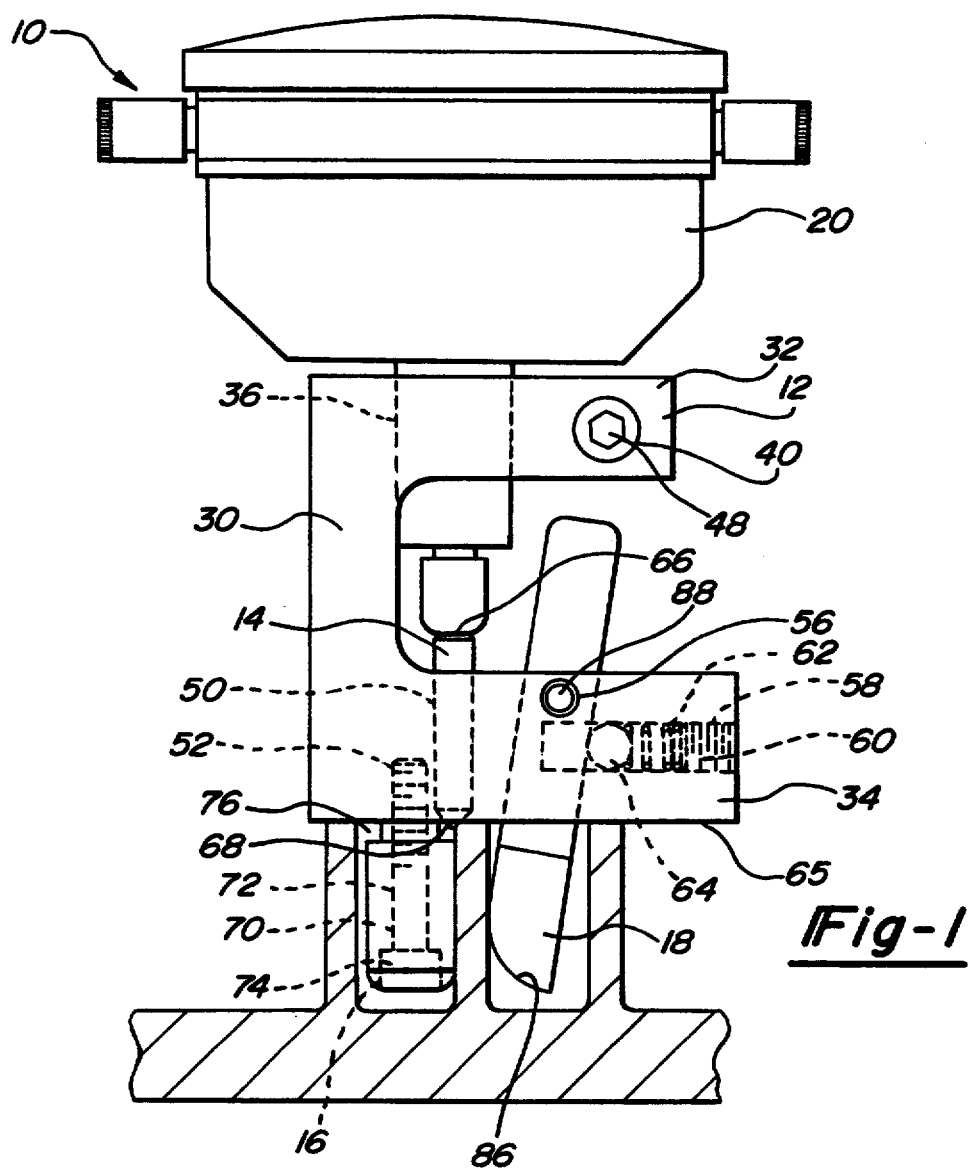
FIG. 1 is a longitudinal side view of a scroll chamfer gauge according to the present invention gauging a typical scroll chamfer.
Figure 2:
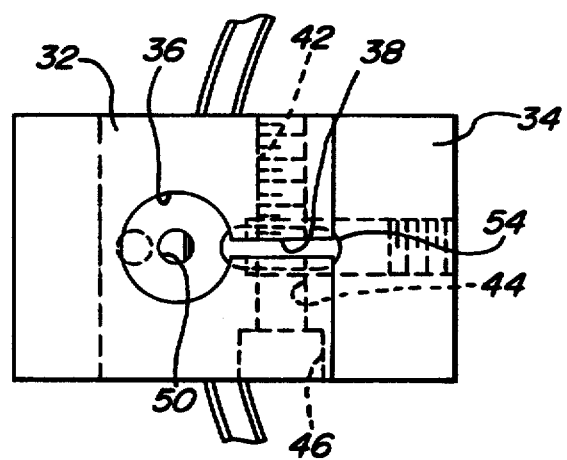
FIG. 2 is a plan view of the scroll chamfer gauge housing of FIG. 1 with the dial indicator and other components removed.

Referring now to the drawings in which like reference numerals designate like or corresponding parts throughout the several views, there is shown in FIGS. 1 through 5 a scroll chamfer gauge according to the present invention which is designated generally as reference numeral 10. Scroll chamfer gauge 10 comprises a housing 12, a probe 14, a fixed locator 16, a moveable locating fork 18 and an indicator 20. Indicator 20 is the means for indicating the axial length of the chamfer. Indicator 20 can be any type of indicator which is capable of providing a readout of the longitudinal movement of its sensing member. In the preferred embodiment, indicator 20 is a dial indicator manufactured by Standard Gage Co., Inc., their Model Number D9-23171.

Housing 12 is a generally C-shaped housing having a generally vertical member 30 and a pair of horizontal members 32 and 34 extending from opposite ends of vertical member 30 as shown in FIGS. 1 and 4. Horizontal member 32 is adapted to locate and secure dial indicator 20. A cylindrical bore 36 extends completely through horizontal member 32, generally parallel to vertical member 30. A slot 38 also extends through horizontal member 32 beginning at cylindrical bore 36 and ending at the end of horizontal member 32 opposite to vertical member 30. A second bore 40 extends through horizontal member 32 and slot 38 generally perpendicular to slot 38 and cylindrical bore 36. The portion of second bore 40 located on one side of slot 38 defines a threaded bore 42. The portion of second bore 40 located on the opposite side of slot 38 defines a through bore 44 and a counterbore 46. Through bore 44 and counter bore 46 are adapted to accept a socket head cap screw 48 to provide for the adjusting of dial indicator 20 during the calibration operation as described later herein.

Horizontal member 34 has a cylindrical through bore 50 which is generally parallel to and axially aligned with bore 36 in horizontal member 32. Bore 50 is sized such that probe 14 can be slidingly received within bore 50 while at the same time limiting any cocking of probe 14 with respect to bore 50. A threaded hole 52 extends into horizontal member 34 generally parallel to and spaced from bore 50. Threaded bore 52 threadingly mounts fixed locator 16 as will be described later herein. A generally oval shaped slot 54 extends through horizontal member 34 generally parallel to and spaced from bore 50. A cylindrical through bore 56 extends through horizontal member 34 and slot 54 generally perpendicular to bore 50. Through bore 56 in conjunction with slot 54 are used to accommodate moveable locating fork 18 as will be described later herein.

An additional threaded bore 58 extends into slot 54 from the end of horizontal member 34 opposite to vertical member 30. Bore 58 is generally perpendicular to both bore 50 and slot 54. Bore 58 threadingly receives a set screw 60 which traps a coil spring 62 and a ball 64 within bore 58. Ball 64 bears against locating fork 18 to bias fork 18 towards fixed locator 16 due to the force exerted by coil spring 62. The biasing load of coil spring 62 is adjustable by turning set screw 60. A lower surface 65 of horizontal member 34 provides a means for locating chamfer gauge 10 relative to the tip surface of the vane being measured.

Probe 14 is a cylindrical probe which is slidingly received in bore 50. Probe 14 has a flat surface 66 at the end which mates with dial indicator 20 and a conical shaped surface 68 which mates with the master gauge or actual part being measured. As shown in FIG. 5, the angle of conical surface 68 is slightly less than the angle of the chamfer on the part. In the preferred embodiment, the angle of the chamfer is 45° and the angle of the conical surface is 40°. This 40° is measured from the longitudinal axis of probe 14 which thus gives a tip angle of 80° for conical surface 68. The purpose for this relationship of the angles is to insure that conical surface 68 of probe 14 contacts the intersection between the chamfer on the tip of the scroll and the vertical flank surface on the wrap as shown in FIG. 5. This relationship then provides a direct reading for the side dimension of the chamfer along the wrap height direction.

Fixed locator 16 is a cylindrical shaped member having a through bore 70 extending axially through it. Through bore 70 has a cylindrical portion 72 and a counterbore 74 which is adapted to receive a socket head cap screw. The socket head cap screw extends through through bore 70 and is threadingly received within threaded hole 52 to mount fixed locator 16. Fixed locator 16 provides a means for locating chamfer gauge 10 relative to the flank surface of the vane being measured. The upper portion of fixed locator 16 which is the portion which abuts surface 65 on horizontal member 34 has an annular recess 76 which provides for clearance for surface 68 of probe 14 to extend through the bottom of horizontal member 34 and contact the chamfer which is being measured.

Moveable locating fork 18 has a longitudinally extending T-shaped base 80 which mates with a pair of tines 82 extending from base 80. A through bore 84 extends through base 80 of locating fork 18 and is adapted to mate with through bore 56 in horizontal member 34 of housing 12 to pivotably mount locating fork 18. Each tine 82 has a radiused surface 86 which is designed to bear against the wrap or master gauge being measured and thus bias fixed locator 16 against the flank surface of the vane being measured. Fork 18 is mounted within slot 54 in horizontal member 34 by positioning fork 18 such that base 80 extends between horizontal members 32 and 34 and aligning bore 84 with bore 56. Once bore 84 is aligned with bore 56, a roll pin 88 is inserted through bores 56 and 84. Thus fork 18 is free to pivot on roll pin 88 within slot 54. Once fork 18 has been assembled into slot 54, radiused surface 86 is biased towards fixed locator 16 by ball 64 bearing against base 80 under the load exerted by spring 62 which is located between ball 64 and set screw 60. The positioning of threaded bore 58 being below through bore 56 creates a lever arm action for the biasing of locator fork 18 towards locator 16.

Prior to operation of the gauge, the gauge must be calibrated by being set to measure a known chamfer. This is normally done using a master gauge having a known chamfer. When chamfer gauge 10 is positioned on the master gauge, the gauge is normally set to read zero. Then when measuring an actual part, the reading given by chamfer gauge 10 will be a plus or minus variance from the known chamfer on the master gauge. First, set screw 48 is loosened allowing dial indicator 20 to move axially within bore 36. Dial indicator 20 is located axially with respect to housing 12 when chamfer gauge 10 is placed on the master gauge and surface 65 locates chamfer gauge 10 relative to the tip surface and locator 16 locates chamfer gauge 10 relative to the flank surface. In this position, conical surface 68 contacts the known chamfer on the master gauge and dial indicator 20 is located approximately midway into its allowable longitudinal movement. Once located axially, set screw 48 is tightened which pinches dial indicator 20 within bore 36 due to slot 38 allowing for a slight deflection of horizontal member 32. Chamfer gauge 10 is then repositioned on the master gauge by depressing the upper end of fork 18 and locating the vane of master gauge between locator 16 and fork 18. Surface 65 of housing 12 is then positioned against the upper portion or tip surface of the master gauge, and the dial indicator is set at the appropriate reading for the size of the known chamfer on the master gauge. Chamfer gauge 10 is then ready to directly read the plus or minus variance of the side dimension of the chamfer along the wrap height dimension.

The operation of scroll chamfer gauge 10 is shown in FIG. 1 and FIG. 5. The upper end of moveable locating fork 18 is depressed by the operator to move tines 82 away from fixed locator 16. Chamfer gauge 10 is then positioned over a scroll wrap as shown in FIG. 1 with the wrap, which is being gauged, located between fixed locator 16 and movable locating fork 18. The upper end of fork 18 is released and the wrap being measured is sandwiched between locator 16 and fork 18 due to the biasing of coil spring 62. In this position, fixed locator 16 is biased against the flank surface of the vane being measured. Surface 65 of housing 12 is positioned against the upper tip surface of the scroll wraps and conical surface 68 of probe 14 will contact the edge of the chamfer as shown in FIG. 5. Probe 14 will move dial indicator 20 which will directly indicate the variance of the side dimension of the chamfer along the wrap height direction from the preset standard. Chamfer gauge 10 can then be removed and positioned at other locations along the scroll wrap by again exerting pressure on the upper end of fork 18 and repeating the above procedure.

While the above detailed description describes the preferred embodiment of the present invention, it should be understood that the present invention is susceptible to modification, variation and alteration without deviating from the scope and fair meaning of the subjoined claims.

What is claimed is:

1. A chamfer gauge for directly measuring a chamfer located between a first and a second surface, said chamfer gauge comprising:
    means for locating said gauge with respect to said first surface;
    means for locating said gauge with respect to said second surface;
    probe means for locating the intersection of said chamfer with said second surface while said gage is positioned by said means for locating said gauge with respect to said first surface and said means for locating said gauge with respect to said second surface; and
    means associated with said probe means for directly indicating the axial length of said chamfer along said second surface.

2. The chamfer gauge according to claim 1 wherein said probe means includes a cylindrical probe having a conically shaped end, said conically shaped end having an angle which is less than the angle of said chamfer.

3. The chamfer gauge according to claim 2 wherein said indicating means comprises a dial indicator for providing a direct reading for the height of said chamfer parallel to said second surface.

4. The chamfer gauge according to claim 1 wherein said means for locating said gauge with respect to said second surface comprises:
    a lever arm pivotably attached to said means for locating said gauge with respect to said first surface;
    a locator fixedly secured to said means for locating said gauge with respect to said first surface, said locator operable to mate with said second surface, said lever arm operable to hold said locator against said second surface.

5. The chamfer gauge according to claim 4 further comprising biasing means for urging said lever arm towards said locator in order to bias said locator against said second surface.

6. The chamfer gauge according to claim 5 wherein said biasing means comprises a coil spring.

7. The chamfer gauge according to claim 4 wherein said indicating means comprises a dial indicator for providing a direct reading for the height of said chamfer parallel to said second surface.

8. The chamfer gauge according to claim 1 wherein said second surface is non-linear.

9. A chamfer gauge for directly measuring a chamfer located between a first and a second surface, said chamfer gauge comprising:
    a housing having a mounting surface operable to locate said gauge with respect to said first surface;
    a locator extending from said mounting surface, said locator operable to locate said gauge with respect to said second surface;
    a lever arm pivotably attached to said housing, said lever cooperating with said locator to hold said locator against said second surface;
    a cylindrical probe slidably received within said housing, said cylindrical probe operable to locate the intersection of said chamfer and said second surface while said gage is positioned by said mounting surface with respect to said first surface and said locator with respect to said second surface; and
    means associated with said cylindrical probe for directly indicating the axial length of said chamfer along said second surface.

10. The chamfer gauge according to claim 9 wherein said cylindrical probe has a conical shaped end having an angle which is less than the angle of said chamfer.

11. The chamfer gauge according to claim 9 wherein said indicating means comprises a dial indicator for providing a direct reading for the height of said chamfer parallel to said second surface.

12. The chamfer gauge according to claim 9 further comprising biasing means for urging said lever arm towards said locator in order to bias said locator against said second surface.

13. The chamfer gauge according to claim 12 wherein said biasing means comprises a coil spring.

14. The chamfer gauge according to claim 9 wherein said second surface is non-linear.

15. A method for directly measuring the axial length of a chamfer between a first surface and a second surface, said method comprising the steps of:
    positioning a mounting surface of a gauge relative to said first surface;
    positioning a locator of said gauge relative to said second surface;
    locating the intersection between said chamfer and said second surface with a probe of said gauge while said mounting surface is positioned relative to said first surface and said locator is positioned relative to said second surface; and
    directly indicating the axial length of said chamfer along said second surface based on movement of said probe.

16. The method according to claim 15 further comprising the step of biasing said gauge towards said second surface.

17. The chamfer gauge according to claim 15 wherein said first surface is located on the tip of a scroll wrap.

18. The chamfer gauge according to claim 15 wherein said second surface is non-linear.

19. The chamfer gauge according to claim 15 wherein said second surface is a flank surface of a scroll wrap.

* * * * *